Nov. 16, 1937.  D. J. FOURNET  2,099,264
MOUTH WIPER FOR TYPESETTING MACHINES
Filed May 21, 1936  2 Sheets-Sheet 1

Fig. 1.

Inventor:
Donald J. Fournet,
By Potter, Pierce & Scheffler,
Attorneys

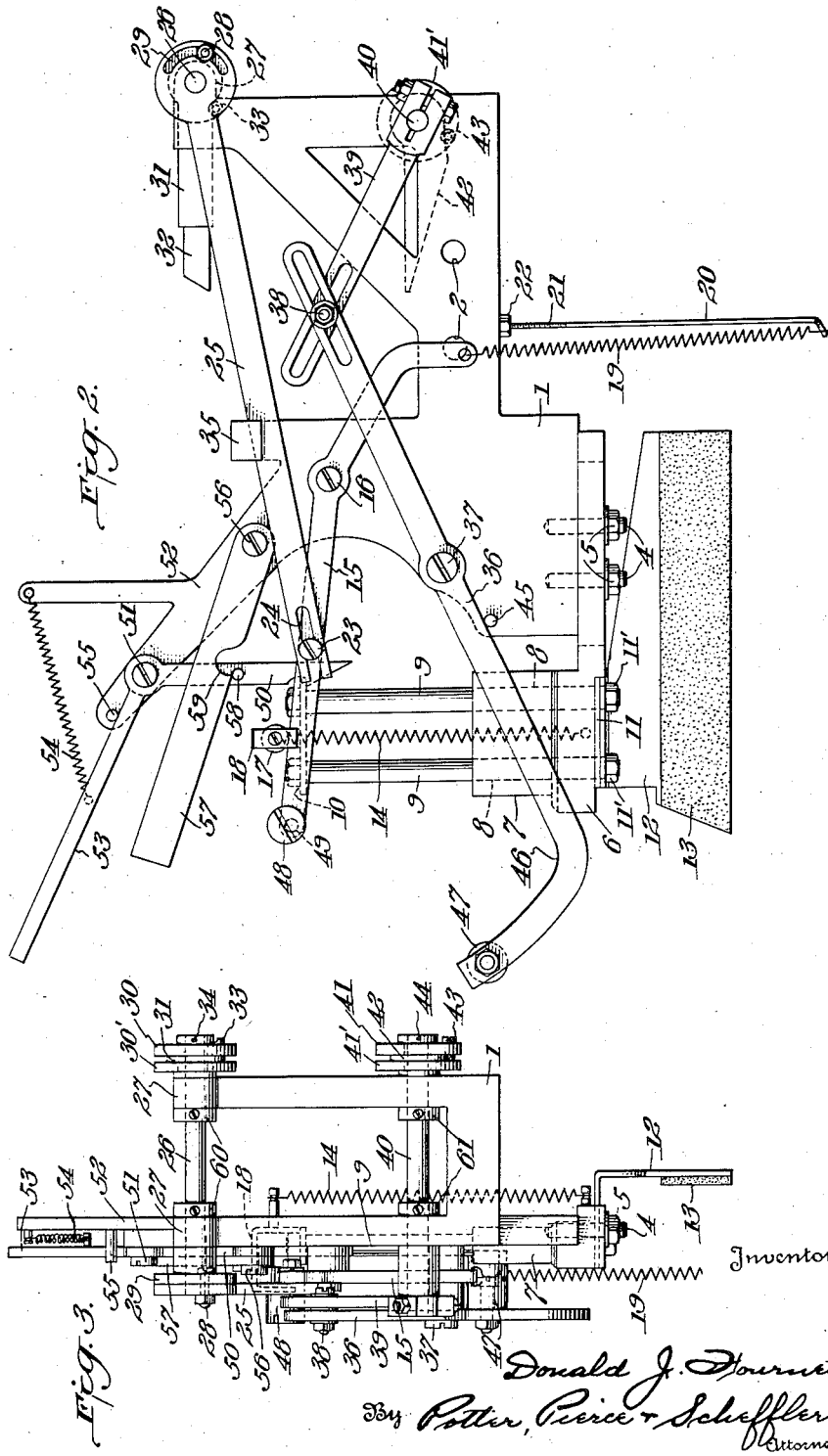

Patented Nov. 16, 1937

2,099,264

UNITED STATES PATENT OFFICE 2,099,264

MOUTH WIPER FOR TYPESETTING MACHINES

Donald J. Fournet, Lafayette, La.

Application May 21, 1936, Serial No. 81,082

11 Claims. (Cl. 199—62)

This invention relates to typesetting machines, particularly Mergenthaler machines, and it has special reference to a wiper for wiping the mouth of the metal pot of the machine.

One object of the invention is to provide an improved mouth wiper which will automatically wipe upward and downward over the mouthpiece of the metal pot, and thereby keep the same free and clean of any accumulation of molten type metal, flakes or fins, after each casting operation.

A further object of the invention is to provide a mouth wiper which is of relatively simple and cheap construction, and which may be applied to machines in use without in any way modifying their form or mode of operation.

A still further object of the invention is to provide a mouth wiper actuated by standard parts of the typesetting machine whereby its operation of wiping the mouthpiece of the metal pot will be accomplished in timed relation to the axial reciprocation of the mold disk of the machine, as is necessary for proper functioning of devices of this general type.

A still further object of the invention is to provide mechanism in combination with the wiper whereby its improper operation, or operation out of time with moving parts of the typesetting machine may be guarded against, thereby preventing fouling and stoppage of the machine.

The invention contemplates a wiper for the mouth of the metal pot of typesetting machines, particularly machines of the Mergenthaler variety, including a wiper element, and a linkage system for supporting the wiper element and automatically moving the same across the mouthpiece of the metal pot, such movement being controlled by cooperation of moving parts of the machine in timed relation to the operation of the machine parts.

In the accompanying drawings illustrating the invention, in the several figures of which like parts are similarly designated, Fig. 1 is a fragmentary front elevation of a typesetting machine of the kind referred to, the device of the invention being shown in combination therewith.

Fig. 2 is an enlarged rear elevation of the wiper mechanism, and

Fig. 3 is an end view of the wiper mechanism as seen from the right hand end of Fig. 2.

Referring to Fig. 1, the parts of the typesetting machine which will be referred to specifically hereinafter are the mold disk A, the mouthpiece B of the mold pot, the first elevator C, the second elevator D, and a part E of the machine frame.

The device of the invention comprises a bracket 1 drilled as indicated at 2 to provide holes for the reception of attaching bolts or screws 3 whereby it may be affixed to the frame E of the typesetting machine by the utilization of openings already provided therein. To the under face of the bracket 1 is adjustably secured by stud bolts 4 and nuts 5, or the like, a longitudinally slotted extension member 6 carrying a bearing block 7 drilled as indicated at 8 to receive two vertically arranged rods 9 connected at their upper ends by a plate 10 and at their lower ends by a plate 11 to form a frame slidable in the block 7. Bolts 11' extend through the transversely slotted offset of the wiper blade or element 12 which is provided with a facing of asbestos 13 or other suitable relatively soft non-inflammable wiping material.

A spring 14 connected with the plate 10 and extension 16 has a tendency, normally, to force the wiper blade to its lowest position. This tendency to downward movement is counteracted by a lever 15 pivoted to the bracket 1 by stud 16 and having one end engaging a roller 17 carried in a U-shaped bearing element 18 which may be formed as a part of the plate 10. The opposite end of the lever 15 has connected with it a spring 19 attached to the end of a rod 20 adjustable in the bracket 1, as is indicated by the screwthread 21 and nut 22. The force exerted by spring 19 is greater than that exerted by the spring 14, and hence by cooperation of the lever 15 with the roller 17, the frame carrying the wiper blade 12 is normally retained at the limit of its upward movement as shown particularly in Figs. 2 and 3.

Coupled to the lever 15 by a stud 23 and yoke 24 is a lever 25 mounted upon one end of a shaft 26 carried in bearings 27 in the bracket 1. This lever 25 may be adjustably secured as indicated at 28 to a plate 29 rotatable with the shaft 26. Applied to the other end of the shaft 26, and turning with it, is a plate 30 between which and a similar plate 30' is mounted an arm 31 having an adjustable extension element 32, forming a trip. The plates 30 and 30' are preferably coupled together beneath the arm 31 by means of a stud 33 against which the arm 31 normally bears, and by this, or other suitable means, a lost motion connection is provided, for a purpose hereinafter appearing. The plate 30 may be pinned to the shaft 26 as indicated at 34. Upward movement of the lever 25, and hence also of the lever 15 is limited by an overhanging lip

35 on the bracket 1, which lip may also act as a brake to prevent rebound of the parts after engagement of the lever 25 with it.

A second lever 36 pivoted at 37 to the bracket 1 has one end connected by a slot and bolt connection 38 with a similarly slotted crank arm 39 adjustably clamped upon one end of a shaft 40 mounted in suitable bearings in the bracket 1, and carrying at its other end a plate 41 which is mounted to turn with it and between which and a similar plate 41' is mounted a trip member 42 by a suitable lost motion connection comprising, in the form shown, a stud 43 against which the member 42 normally bears in a manner similar to the lost motion connection provided by the parts 30, 30' and 33, and for a similar purpose, as will later appear. The plate 41 may be pinned to the shaft 40, as indicated at 44. A pin 45 is provided to limit motion of the lever 36 in one direction.

The opposite end of the lever 36 is curved as indicated at 46 and carries at its extremity an offstanding roller 47. The curved portion 46 is adapted to engage a contact member 48 adjustably mounted by means of an eccentric connection 49 upon the end of the lever 15, and, as will appear hereinafter, cooperation between these parts serves to ensure return of the frame carrying the wiper blade to the upward limit of its movement.

When the frame is at the upward limit of its movement, the plate 10 is in position to be engaged by a dog 50 pivoted at 51 upon an extension 52 of the bracket 1, and this dog is provided with an arm 53 standing off into the path of movement of the second elevator D. The arm 53 is connected with the extension 52 by a spring 54 which tends normally to hold it against a stop pin 55 and thus force the dog 50 into holding engagement with the plate 10, thereby to restrain the frame carrying the wiper blade from downward movement. A stud 56 on frame 1 pivotally supports a latch member 57 arranged to engage a pin 58 carried by the dog 50, so that when the arm 53 is depressed and the dog thereby moved out of engagement with the plate 10, the latch member 57 may drop downward so that its notch 59 will engage the pin 58 to hold the dog in released position. The roller 47, previously described, is so positioned upon the lever 36 that when that end of the lever is elevated, the roller 47 will engage with and raise the latch 57 to thus release its notch 59 from the pin 58 of the dog, thereby freeing the dog for engagement, under the influence of its spring 54, with the plate 10 of the frame.

By virtue of the arrangement of the holes 2 in the bracket 1, whereby the bracket is attached by the bolts 3 to the frame E of the typesetting machine, the parts of the device of the invention will be located respectively in proper position for effective operation during the functioning of the typesetting machine. The wiper blade or element 12 will be so positioned that when it is depressed, during axial outward movement of the mold-carrying disk A, it will pass between the inner face of the disk A and the vertically disposed face of the mouthpiece B, and its facing element 13 will wipe over the mouthpiece and clear it of type metal as hereinbefore indicated. Moreover, the trips 32 and 42 will extend to the front of the machine frame and into the path of movement of the first elevator C. Likewise, the arm 53 will extend into the path of movement of a part of the second elevator D. Axial adjustment of the shafts 26 and 40 is provided for by screw-adjusted collars 60 and 61.

The various means provided for adjustment of parts of the device of the invention, as hereinbefore described, will make it possible to properly accommodate the various parts of the device to the parts of the typesetting machine with which they are designed for cooperation.

It will be understood that, as illustrated in Fig. 1, the parts of the typesetting machine are in the positions assumed by them just after the type matrices have been transferred from the first elevator to the second elevator, and the second elevator has started its ascent to its upper transfer position. Furthermore, as is well known, the first elevator assumes, during the operation of the machine, three distinct positions, viz., its normal position, which is substantially in line with the frame part E, its casting position, which is in line with the mouthpiece B, and its upper transfer position, which is that illustrated in the drawings.

With the parts in the positions shown in Fig. 1, it being understood that the arm 53 of the device of the invention has been depressed and the latch 57 is in position to hold the dog 50 out of engagement with the plate 10 of the frame of the wiper blade, operation of the typesetting machine during its normal functioning will result in operation of the device of the invention as follows. When the first elevator C during its descent from the position shown to normal position strikes trip 32 and depresses it, lever 25 will be similarly depressed, and through its connection with lever 15 will move this lever out of engagement with the roller 17 and, very quickly, to such a lowered position as to permit the wiper blade 12 and its carrying frame to be very quickly moved downward under the influence of the spring 14 to thus wipe over the mouth of the mouthpiece and clear it of type metal, it being understood that at this time the mold disk A has been moved axially outwardly to its outermost position, thus leaving a space sufficient to accommodate the wiper blade 12. As the lever 15 moves downwardly, its opposite end, which is connected with the spring 19 moves upwardly and puts the spring 19 under tension, and inasmuch as the adjustment of the trip extension 32 is such that it is cleared by the first elevator C immediately upon full depression of the lever 15, as soon as this clearing takes place the lever 15 will immediately move upward under the influence of the spring 19, which as stated is stronger than the spring 14, and will return the frame and with it the wiper blade 12 to the limit of its upward movement. This upward and downward movement of the wiper blade 12 must, necessarily, be very rapid, for the reason that the period of separation of the mold disk A from the mouthpiece B is very short, and the wiping action must be accomplished during this period.

As the first elevator C continues its downward movement toward normal position, it actuates trip 42 to thereby operate lever 36, the curved portion of 46 of which coming in contact with the member 48 ensures return of the frame and wiper blade 12 to the limit of upward movement. It is to be noted that proper eccentric adjustment of the member 48 makes possible assurance that the frame will be fully elevated. At the same time, roller 47 raises the end of latch 57 and frees dog 50 so that, under the influence of spring 54, the dog may move from the position illustrated in Fig. 1 to that illustrated in Fig. 2, in which latter it operates to hold the frame and wiper blade in uppermost position.

As the first elevator C moves from normal position to casting position and thence back to the transfer position illustrated in Fig. 1, the parts of the device of the invention will remain in the positions last described. However, as the elevator C passes the trips 42 and 32, during its upward movement, these trips will clear it by virtue of their lost motion connections already described.

When, with the first elevator C in its uppermost position, the second elevator D descends for the transfer of the matrices to it, the second elevator D will depress the end of arm 53 to free the dog from the plate 10 of the frame of the wiper blade and thus permit the latch member 57 to engage the pin 58 to hold the dog in the position hereinbefore described and illustrated in Fig. 1, the parts of the device of the invention now being so set as to perform another wiping operation, as described, upon the next descent of the first elevator C.

From the foregoing, it will be apparent that the device of the invention is not only relatively simple in its construction and mode of operation, but that it embodies such features of design and method of operation that its interference with the proper functioning of the typesetting machine is made practically impossible. For example, the wiper blade 12 can never remain in its depressed position long enough to foul the mold disk A upon its return from its outermost position, because the lever 36 automatically returns the wiper blade to its elevated position prior to the commencement of the return movement of the mold disk.

Moreover, all parts of the device being operated in timed relation to and by moving parts of the typesetting machine itself, the operation of which is timed to the type casting operation, a failure in timing of the wiping mechanism can occur only due to improper adjustment of its parts or failure in timing of the parts of the typesetting machine from which the parts of the wiping mechanism derive their motion.

Various changes and modifications are contemplated as within the spirit of the invention and the scope of the following claims.

I claim:

1. A wiper for the vertically disposed mouth of the metal pot of typesetting machines, including a wiper element adapted to be advanced and retracted over the mouthpiece of said metal pot, means supporting said element for rectilinear reciprocating movement in operative relation to said mouthpiece, means for automatically moving said wiper element in both directions over said mouthpiece, and means operated in timed relation to the movement of the mold disk of the machine for controlling actuation of said automatic moving means, said automatic moving means operating independently of direct connection with the moving parts of the machine.

2. A wiper for the vertically disposed mouth of the metal pot of typesetting machines, including a wiper element, means for supporting said wiper element in normal position above the mouthpiece of the metal pot, resilient means for automatically moving said wiper element over said mouthpiece and back to normal position, and means operated in timed relation to the movement of the mold disk of the machine for controlling the actuation of said resilient means.

3. A wiper for the vertically disposed mouth of the metal pot of typesetting machines, including a wiper element, means for mounting said wiper element for reciprocative movement whereby it may be advanced and retracted over the mouthpiece of said metal pot, resilient means for imparting said reciprocative movement to the wiper element in both directions, and means operated in timed relation to the movement of the mold disk of the machine for controlling the actuative effect of said resilient means.

4. A wiper for the vertically disposed mouth of the metal pot of typesetting machines, including a wiper element adapted to be advanced and retracted over the mouthpiece of said metal pot, means for mounting said wiper element in operative relation to said mouthpiece, resilient means operative to reciprocate said wiper element over said mouthpiece in both directions, and means for controlling the reciprocation of said wiper element under the influence of said resilient means, said controlling means including members actuated by the matrix elevator mechanism of said machine.

5. A wiper for the vertically disposed mouth of the metal pot of typesetting machines, including a wiper element, means for mounting said wiper element for rectilinear reciprocating movement with respect to the mouthpiece of said metal pot, means for imparting such movement to said wiper element, lever mechanism for controlling the movement of said wiper element in timed relation to the movement of the mold disk of said machine, and means operable by and in response to movement of the matrix elevator mechanism of said machine for actuating said lever mechanism.

6. A wiper for the mouth of the metal pot of typesetting machines, including a wiper element arranged for vertical reciprocation with respect to and against the mouthpiece of said metal pot, resilient means for imparting such movement to the wiper element, means operable by the first elevator member of said machine for permitting actuation of said wiper element by said resilient means, means for restraining said wiper element against movement, and means operable by the second elevator member of said machine for releasing said restraining means.

7. A wiper for the mouth of the metal pot of typesetting machines, including a wiper element mounted for reciprocation over the mouthpiece of said metal pot, means for imparting such reciprocation, a lever for normally holding said wiper element in position remote from said mouthpiece, means operable by a member of said machine for displacing said lever to permit reciprocation of said wiper element under the influence of said reciprocation-imparting means, a lever actuated by said member of the machine for insuring return of said wiper element to its initial position, and means additional to said lever and releasable in timed relation to the normal cycle of operation of the machine for restraining said wiper element against reciprocation.

8. A wiper for the mouth of the metal pot of typesetting machines, including a wiper element, a mounting bracket, a frame slidably carried by said bracket and upon which said wiper element is mounted for vertical reciprocation with respect to the mouthpiece of said metal pot, a lever cooperating with said frame and functioning normally to prevent movement of said wiper element, a trip member cooperating with said lever and operable in response to movement of the first elevator member of the machine to release said frame for reciprocation, means connected with said frame and lever, respectively, for imparting such reciprocation, a second lever operable to insure return of said frame to the upper limit of its movement, a trip member cooperating with said second lever and operable in response to further movement of said first elevator member to actuate said second lever, a dog for retaining said frame in its upper position, an arm connected with said dog and actuated by the second elevator member of the machine to release said dog, and a latch member cooperating with said dog to hold it out of frame-engaging position, said latch member releasable by cooperation therewith of said second lever.

9. A wiper for the mouth of the metal pot of a typesetting machine, including a wiper element, means mounting said wiper element for movement towards and away from the metal pot, resilient means tending to move said wiper element to and across the mouth of the metal pot, a second resilient means tending to move said wiper element away from the metal pot, said second resilient means being of greater power than said first resilient means, thereby normally retaining the wiper element at a point remote from the mouth of the metal pot, and means positioned for actuation by a part of the typesetting machine for momentarily rendering said second resilient means inoperative, whereby said wiper element is moved to the metal pot by said first resilient means and then restored to its normal position by the second resilient means.

10. In a wiper for the metal pot of a typesetting machine, the combination with a wiper element, and frame means supporting the same for vertical reciprocation between an upper inoperative position and a lower mouth-wiping position, of spring means tending to move said frame means and wiper element downward, a lifting member and spring means normally retaining the same in position to prevent downward movement of said frame means and wiper element by the first spring means, and means positioned for actuation by a part of the typesetting machine to displace said lifting member out of retaining position and immediately thereafter to release the same, whereby the frame means and wiper element are moved downward into wiping position by the first spring means and immediately raised by said lifting member and the second spring means.

11. A wiper as claimed in claim 2, in combination with means for positively returning said wiper to normal position in the event of a failure of said resilient means to perform such return movement.

DONALD J. FOURNET.